United States Patent
Clark et al.

(10) Patent No.: US 10,829,198 B2
(45) Date of Patent: Nov. 10, 2020

(54) KRUEGER FLAP APPARATUS AND METHODS INCORPORATING A BULLNOSE HAVING A CONTOUR VARIATION ALONG A SPANWISE DIRECTION

(71) Applicant: The Boeing Company, Chicago, IL (US)

(72) Inventors: Adam M. Clark, Mukilteo, WA (US); Kenneth J. Kaufmann, Bellevue, WA (US); Paul M. Vijgen, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 621 days.

(21) Appl. No.: 15/629,542

(22) Filed: Jun. 21, 2017

(65) Prior Publication Data

US 2018/0370614 A1    Dec. 27, 2018

(51) Int. Cl.
   *B64C 9/24*     (2006.01)
   *B64C 9/22*     (2006.01)
   *B64C 23/06*    (2006.01)
   *B64C 3/14*     (2006.01)

(52) U.S. Cl.
   CPC .......... *B64C 9/24* (2013.01); *B64C 9/22* (2013.01); *B64C 23/06* (2013.01); *B64C 2003/148* (2013.01)

(58) Field of Classification Search
   CPC .. B64C 9/22; B64C 9/24; B64C 23/06; B64C 2003/148
   See application file for complete search history.

(56) References Cited

U.S. PATENT DOCUMENTS

| | | | |
|---|---|---|---|
| 2,358,985 A * | 9/1944 | McAndrew | B64C 9/22 244/201 |
| 3,941,334 A | 3/1976 | Cole | |
| 4,189,121 A | 2/1980 | Harper et al. | |
| 4,262,868 A | 4/1981 | Dean | |
| 4,427,168 A | 1/1984 | McKinney et al. | |
| 5,158,252 A | 10/1992 | Sakurai | |
| 6,375,126 B1 | 4/2002 | Sakurai et al. | |

(Continued)

FOREIGN PATENT DOCUMENTS

| | | | | |
|---|---|---|---|---|
| GB | 2374331 A * | 10/2002 | | B64C 11/18 |
| GB | 2436861 A * | 10/2007 | | B64C 21/10 |
| WO | WO-2014026246 A1 * | 2/2014 | | B64C 3/16 |

OTHER PUBLICATIONS

Mehdi et al., "Session ET: Biolocomotion IV: Morphology of Flying and Swimming," 63rd Annual Meeting of the APS Division of Fluid Dynamics, vol. 55, No. 16, Nov. 21-23, 2010, abstract only, 1 page.

(Continued)

*Primary Examiner* — Richard R. Green
(74) *Attorney, Agent, or Firm* — Hanley, Flight & Zimmerman, LLC (57) ABSTRACT

Krueger flap apparatus and methods incorporating a bullnose having a contour variation along a spanwise direction are described. An example apparatus includes a Krueger flap having a bullnose extending in a spanwise direction. The bullnose includes a contour variation formed by a plurality of protuberances located along the bullnose. Respective ones of the protuberances are spaced along the spanwise direction.

23 Claims, 7 Drawing Sheets

(56) References Cited

U.S. PATENT DOCUMENTS

| | | | |
|---|---|---|---|
| 7,264,206 B2 | 9/2007 | Wheaton et al. | |
| 7,578,484 B2 | 8/2009 | Fox et al. | |
| 7,828,250 B2 | 11/2010 | Wheaton et al. | |
| 7,992,826 B2 | 8/2011 | Wheaton et al. | |
| 8,226,048 B2 | 7/2012 | Beyer et al. | |
| 9,016,637 B2 | 4/2015 | Sakurai et al. | |
| 9,365,284 B2 | 6/2016 | Sakurai et al. | |
| 9,623,979 B2* | 4/2017 | Rouyre | B64D 29/00 |
| 10,301,942 B2* | 5/2019 | Joseph | F01D 5/141 |
| 10,358,931 B2* | 7/2019 | Paruchuri | B64C 3/14 |
| 10,384,766 B2* | 8/2019 | Rolston | B64C 3/00 |
| 2016/0031550 A1* | 2/2016 | Harrison | B64C 23/06 244/199.1 |
| 2016/0122006 A1* | 5/2016 | Taylor | B64C 23/06 244/200.1 |
| 2018/0209401 A1* | 7/2018 | Herrig | F03D 1/0675 |

OTHER PUBLICATIONS

Miklosovic et al., "Leading-edge tubercles delay stall on humpback whale (*Megaptera novaeangliae*) flippers," Physics of Fluids, vol. 16, Issue 5, accepted Feb. 2004, 5 pages.

Bai et al., "Computational fluid dynamics analysis of the vertical axis wind turbine blade with tubercle leading edge," Journal of Renewable and Sustainable Energy, vol. 7, Issue 3, Jun. 2015, 11 pages.

Rostamzadeh et al., "The effect of undulating leading-edge modifications on NACA 0021 airfoil characteristics," Physics of Fluids, vol. 25, Issue 11, Nov. 2013, 9 pages.

Rostamzadeh et al., "The formation mechanism and impact of streamwise vortices on NACA 0021 airfoil's performance with undulating leading edge modification," Physics of Fluids, vol. 26, Issue 10, Oct. 2014, 11 pages.

Haecheon et al., "Biomimetic flow control based on morphological features of living creatures," Physics of Fluids, vol. 24, Issue 12, Dec. 12, 2012, 35 pages.

Hansen, Kristy Lee, "Effect of Leading Edge Tubercles on Airfoil Performance," School of Mechanical Engineering, University of Adelaide, Thesis submitted Jul. 2012, 325 pages.

Hansen et al., "Performance Variations of Leading-Edge Tubercles for Distinct Airfoil Profiles," AIAA Journal, vol. 49, No. 1, Jan. 2011, 10 pages.

Goodman, T. "Humpback Whale Inspires Best Wind Power Turbines: WhalePower Tubercle Technology," [http://inventorspot.com/articles/humpback_whale_inspires_energy_saving_whalepower_tubercle_techno_30079], retrieved on Apr. 25, 2017, 6 pages.

The Secret of Flight, "Leading Edge Tubercles," [https://secretofflight.wordpress.com/leading-edge-tubercles-2/], retrieved on May 3, 2017, 4 pages.

Wikipedia, "Krueger flap," retrieved from Wikipedia on Apr. 26, 2017, 3 pages.

Watts et al., "The Influence of Passive, Leading Edge Tubercles on Wing Performance," [http://www.otherpower.com/images/scimages/2637/leading_edge_tubercles.pdf], retrieved on Jun. 21, 2017, 9 pages.

Hamilton, Tyler, "Whale-Inspired Wind Turbines," [https://www.technologyreview.com/s/409710/while-inspired-wind-turbines/], published Mar. 6, 2008, retrieved on May 3, 2017, 7 pages.

\* cited by examiner

KRUEGER FLAP APPARATUS AND METHODS INCORPORATING A BULLNOSE HAVING A CONTOUR VARIATION ALONG A SPANWISE DIRECTION

FIELD OF THE DISCLOSURE

This disclosure relates generally to Krueger flaps and, more specifically, to Krueger flap apparatus and methods incorporating a bullnose having a contour variation along a spanwise direction.

BACKGROUND

Krueger flaps are lift enhancement devices for use with airfoils (e.g., wings) of aircraft. Conventional Krueger flaps are movable between a stowed position located at an underside of an airfoil to which the Krueger flap is coupled, and a deployed position in which at least a portion of the Krueger flap is located forward of a leading edge of the airfoil. When deployed, a Krueger flap increases the camber of the airfoil to which the Krueger flap is coupled, and also increases the coefficient of lift associated with the airfoil at higher angles of attack. The deployment of Krueger flaps typically provides for improved (e.g., increased) handling of the aircraft at lower speeds (e.g., aircraft speeds of Mach 0.4 or less).

SUMMARY

Krueger flap apparatus and methods incorporating a bullnose having a contour variation along a spanwise direction are disclosed herein. In some examples, an apparatus is disclosed comprising a Krueger flap. In some disclosed examples, the Krueger flap has a bullnose extending in a spanwise direction. In some disclosed examples, the bullnose includes a contour variation formed by a plurality of protuberances located along the bullnose. In some disclosed examples, respective ones of the protuberances are spaced along the spanwise direction.

In some examples, an apparatus is disclosed comprising an airfoil having a spanwise direction, and a Krueger flap coupled to the airfoil. In some disclosed examples, the Krueger flap has a bullnose extending in the spanwise direction. In some disclosed examples, the bullnose includes a contour variation formed by a plurality of protuberances located along the bullnose. In some disclosed examples, respective ones of the protuberances are spaced along the spanwise direction. In some disclosed examples, the Krueger flap is movable relative to the airfoil between a stowed position and a deployed position.

In some examples, a method is disclosed. In some disclosed examples, the method comprises moving a Krueger flap relative to an airfoil between a stowed position and a deployed position. In some disclosed examples, the airfoil has a spanwise direction. In some disclosed examples, the Krueger flap is coupled to the airfoil and has a bullnose extending in the spanwise direction. In some disclosed examples, the bullnose includes a contour variation formed by a plurality of protuberances located along the bullnose. In some disclosed examples, respective ones of the protuberances are spaced along the spanwise direction.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Conventional Krueger flaps are movable between a stowed position located at an underside of an airfoil to which the Krueger flap is coupled, and a deployed position in which at least a portion of the Krueger flap is located forward of a leading edge of the airfoil. The orientation of a Krueger flap typically changes (e.g., rotates) as the Krueger flap moves from the stowed position to the deployed position. For example, as the orientation of the Krueger flap rotates between the stowed position and the deployed position, the leading portion and/or leading edge of the Krueger flap when in the stowed position becomes the trailing portion and/or trailing edge of the Krueger flap when in the deployed position. Similarly, the trailing portion and/or trailing edge of the Krueger flap when in the stowed position becomes the leading portion and/or leading edge of the Krueger flap when in the deployed position.

As used herein, the term "airfoil" refers to a spanwise segment of a wing of an aircraft. As used herein in relation to a direction of an object, the term "spanwise" describes an orientation and/or measurement in a direction along the object from a root end of the object to a tip end of the object. For example, a spanwise direction of an airfoil refers to an orientation and/or measurement in a direction along the airfoil from the root end of the airfoil to the tip end of the airfoil. Similarly, a spanwise direction of a wing refers to an orientation and/or measurement in a direction along the wing from the root end of the wing to the tip end of the wing. In some known Krueger flap configurations, the Krueger flap includes a bullnose extending in a spanwise direction along the airfoil to which the Krueger flap is coupled. In connection with such known Krueger flap configurations, the bullnose of the Krueger flap is typically located forward of the leading edge of the airfoil when the Krueger flap is fully deployed. When the Krueger flap is stowed, the bullnose is typically hidden, retracted, and/or housed within the underside of airfoil. In such known Krueger flap configurations, the bullnose has a linear shape along and/or in a spanwise direction of the airfoil.

Unlike the known Krueger flap configurations described above, the Krueger flap apparatus disclosed herein advantageously incorporate a Krueger flap including a bullnose having a contour variation along a spanwise direction of an airfoil. In some disclosed examples, the contour variation is formed by a plurality of protuberances located along the bullnose, with respective ones of the protuberances being spaced along the spanwise direction. When the example Krueger flaps disclosed herein are positioned in a deployed position during a flight of an aircraft, the contour variation of the bullnose is exposed to an airflow. Exposing the contour variation of the bullnose to the airflow advantageously provides for improved aerodynamics and/or handling of the aircraft in which the Krueger flap is implemented. For example, the contour variation of the bullnose may advantageously provide for an increased lift to drag (L/D) ratio associated with the airfoil of the aircraft when the Krueger flap is in a deployed position. In some examples, a reduction in drag attributable to the contour variation may advantageously provide for a reduction in noise associated with the Krueger flap and/or the airfoil to which the Krueger flap is coupled. In some examples, the contour variation of the bullnose may advantageously reduce a rate at which ice forms and/or accumulates on the bullnose of the Krueger flap.

While exposing the contour variation of the bullnose to an airflow may result in improved aerodynamics and/or handling of the aircraft at lower speeds (e.g., aircraft speeds of Mach 0.4 or less) as described above, the contour variation may have an undesirable impact on the aerodynamics and/or handling of the aircraft at higher speeds such as, for example, a cruising speed of the aircraft. When the example Krueger flaps disclosed herein are positioned in a stowed position, however, the contour variation of the bullnose is hidden, retracted, and/or housed within the airfoil to which the Krueger flap is coupled. Thus, the disclosed Krueger flaps may advantageously be placed into the stowed position during flight operations in which exposure of the contour variation of the bullnose to an airflow may have an undesirable impact on the aerodynamics and/or handling of the aircraft (e.g., during a cruise operation of the aircraft). This particular advantage provided by the disclosed Krueger flaps is not capable of being implemented via alternative lift enhancement devices (e.g., slats, airfoils having integrated drooped leading edges, etc.), as the leading and/or forward edges of such alternative lift enhancement devices are not capable of being moved to a position in which a contour variation formed proximate the leading and/or forward edges of such alternative lift enhancement devices is not exposed to an airflow during a flight of the aircraft.

Figure 1:
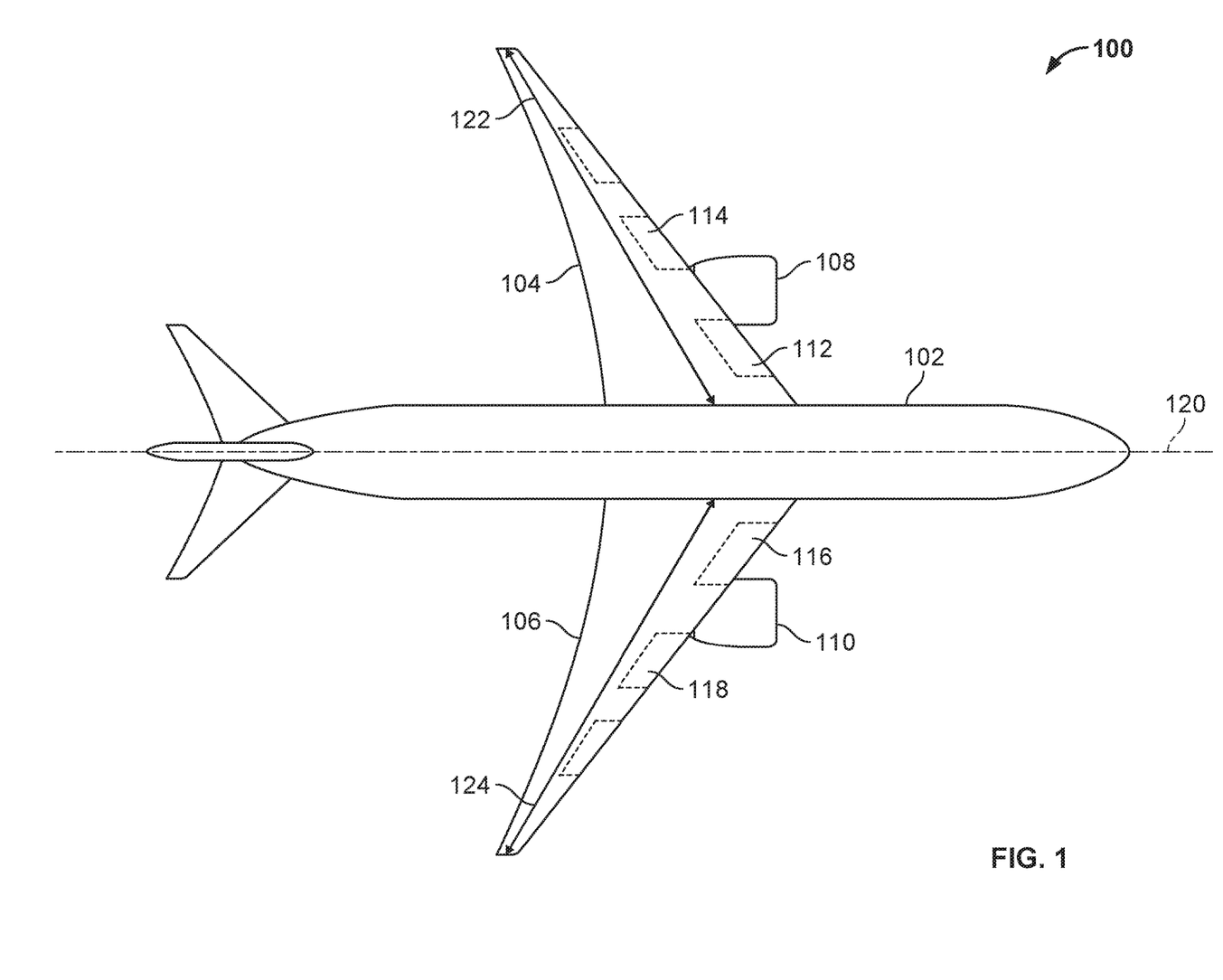
FIG. 1 illustrates an example aircraft in which an example Krueger flap may be implemented in accordance with the teachings of this disclosure.

FIG. 1 illustrates an example aircraft 100 in which an example Krueger flap may be implemented in accordance with the teachings of this disclosure. The aircraft 100 includes an example fuselage 102, a first example wing 104 (e.g., a first airfoil), a second example wing 106 (e.g., a second airfoil), a first example nacelle 108, a second example nacelle 110, a first example Krueger flap 112, a second example Krueger flap 114, a third example Krueger flap 116, and a fourth example Krueger flap 118. The fuselage 102 has a generally cylindrical shape that defines an example longitudinal axis 120 of the aircraft 100. The first wing 104 and the second wing 106 are respectively coupled to the fuselage 102 and typically swept in a rearward and/or aft direction of the aircraft 100. The first wing 104 includes and/or defines a first example spanwise direction 122, and the second wing 106 includes and/or defines a second example spanwise direction 124. The first nacelle 108 is coupled to the first wing 104, and the second nacelle 110 is coupled to the second wing 106.

Respective ones of the first Krueger flap 112, the second Krueger flap 114, the third Krueger flap 116, and the fourth Krueger flap 118 of FIG. 1 may be implemented as any type of Krueger flap including, for example, a fixed panel Krueger flap (e.g., a fixed panel Krueger flap having an integral bullnose, a fixed panel Krueger flap having a folding bullnose, etc.) or a variable camber Krueger flap (e.g., a variable camber Krueger flap having an integral bullnose, a variable camber Krueger flap having a folding bullnose, etc.). In the illustrated example of FIG. 1, respective ones of the first Krueger flap 112, the second Krueger flap 114, the third Krueger flap 116, and the fourth Krueger flap 118 are shown in corresponding respective stowed positions. The first Krueger flap 112 and the second Krueger flap 114 are respectively coupled to and/or deployable from the first wing 104 of the aircraft 100. When in the stowed position of FIG. 1, the first Krueger flap 112 and the second Krueger flap 114 are respectively located at and/or on an underside and/or bottom surface of the first wing 104. The first Krueger flap 112 of FIG. 1 is positioned inboard on the first wing 104 relative to the first nacelle 108, and the second Krueger flap 114 of FIG. 1 is positioned outboard on the first wing 104 relative to the first nacelle 108.

In the illustrated example of FIG. 1, the third Krueger flap 116 and the fourth Krueger flap 118 are respectively coupled to and/or deployable from the second wing 106 of the aircraft 100. When in the stowed position of FIG. 1, the third Krueger flap 116 and the fourth Krueger flap 118 are respectively located at and/or on an underside and/or bottom surface of the second wing 106. The third Krueger flap 116 of FIG. 1 is positioned inboard on the second wing 106 relative to the second nacelle 110, and the fourth Krueger flap 118 of FIG. 1 is positioned outboard on the second wing 106 relative to the second nacelle 110.

As further described below, one or more of the first Krueger flap 112, the second Krueger flap 114, the third Krueger flap 116, and/or the fourth Krueger flap 118 of FIG. 1 includes a bullnose having a contour variation along a spanwise direction associated with the wing to which the Krueger flap is respectively coupled. For example, the first Krueger flap 112 of FIG. 1, which is coupled to the first wing 104 of FIG. 1, may include a bullnose having a contour variation along the first spanwise direction 122 of FIG. 1. As another example, the third Krueger flap 116 of FIG. 1, which is coupled to the second wing 106 of FIG. 1, may include a bullnose having a contour variation along the second spanwise direction 124 of FIG. 1.

In some examples, respective ones of the first Krueger flap 112, the second Krueger flap 114, the third Krueger flap 116, and the fourth Krueger flap 118 of FIG. 1 each include a bullnose having a contour variation along an associated spanwise direction. In other examples, respective ones of the first Krueger flap 112 and the third Krueger flap 116 of FIG. 1 each include a bullnose having a contour variation along an associated spanwise direction, while respective ones of the second Krueger flap 114 and the fourth Krueger flap 118 of FIG. 1 each include a bullnose that is linear along an associated spanwise direction. In still other examples, respective ones of the second Krueger flap 114 and the fourth Krueger flap 118 of FIG. 1 each include a bullnose having a contour variation along an associated spanwise direction, while respective ones of the first Krueger flap 112 and the third Krueger flap 116 of FIG. 1 each include a bullnose that is linear along an associated spanwise direction.

While the aircraft 100 of FIG. 1 is illustrated as having a total of four Krueger flaps (e.g., the first Krueger flap 112, the second Krueger flap 114, the third Krueger flap 116, and the fourth Krueger flap 118), the aircraft 100 of FIG. 1 may in other examples include additional (e.g., six, eight, ten, twelve, etc.) or fewer (e.g., two) Krueger flaps. In some examples, the location(s), size(s), and/or shape(s) of respective ones of the Krueger flaps (e.g., the first Krueger flap 112, the second Krueger flap 114, the third Krueger flap 116, and the fourth Krueger flap 118) of the aircraft 100 may differ relative to the location(s), size(s) and/or shape(s) of the Krueger flaps shown in FIG. 1.

Figure 2:
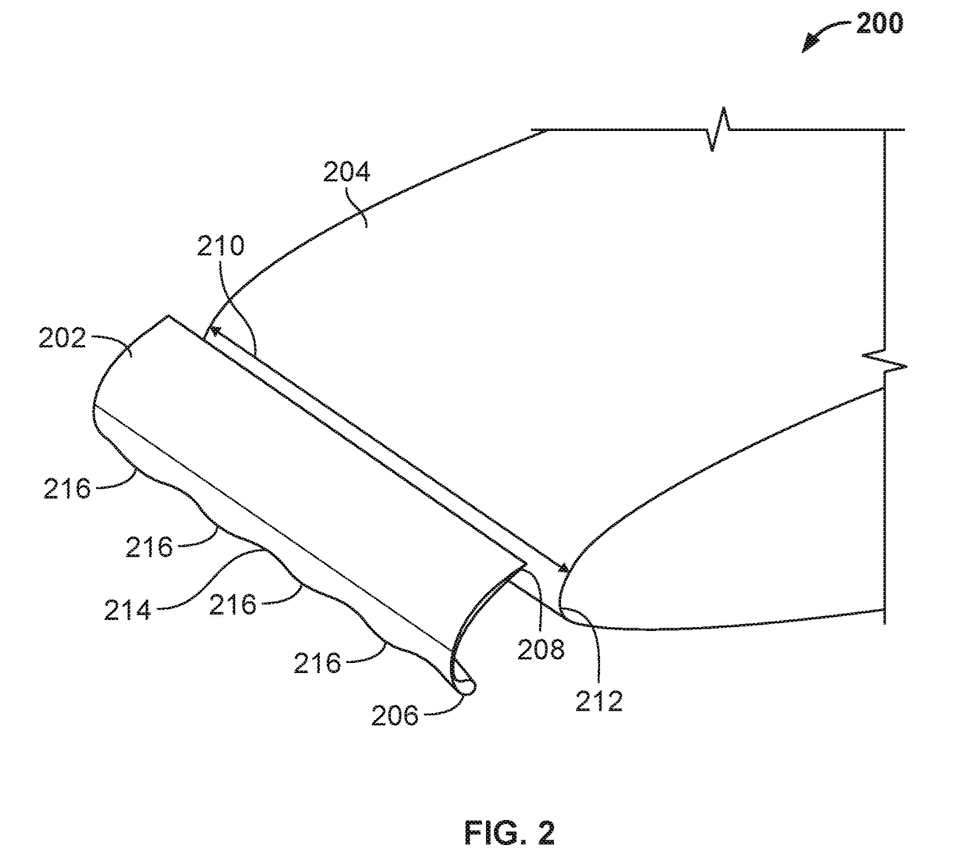
FIG. 2 is a partial cutaway perspective view of an example Krueger flap in an example deployed position relative to an example airfoil.
Figure 3:
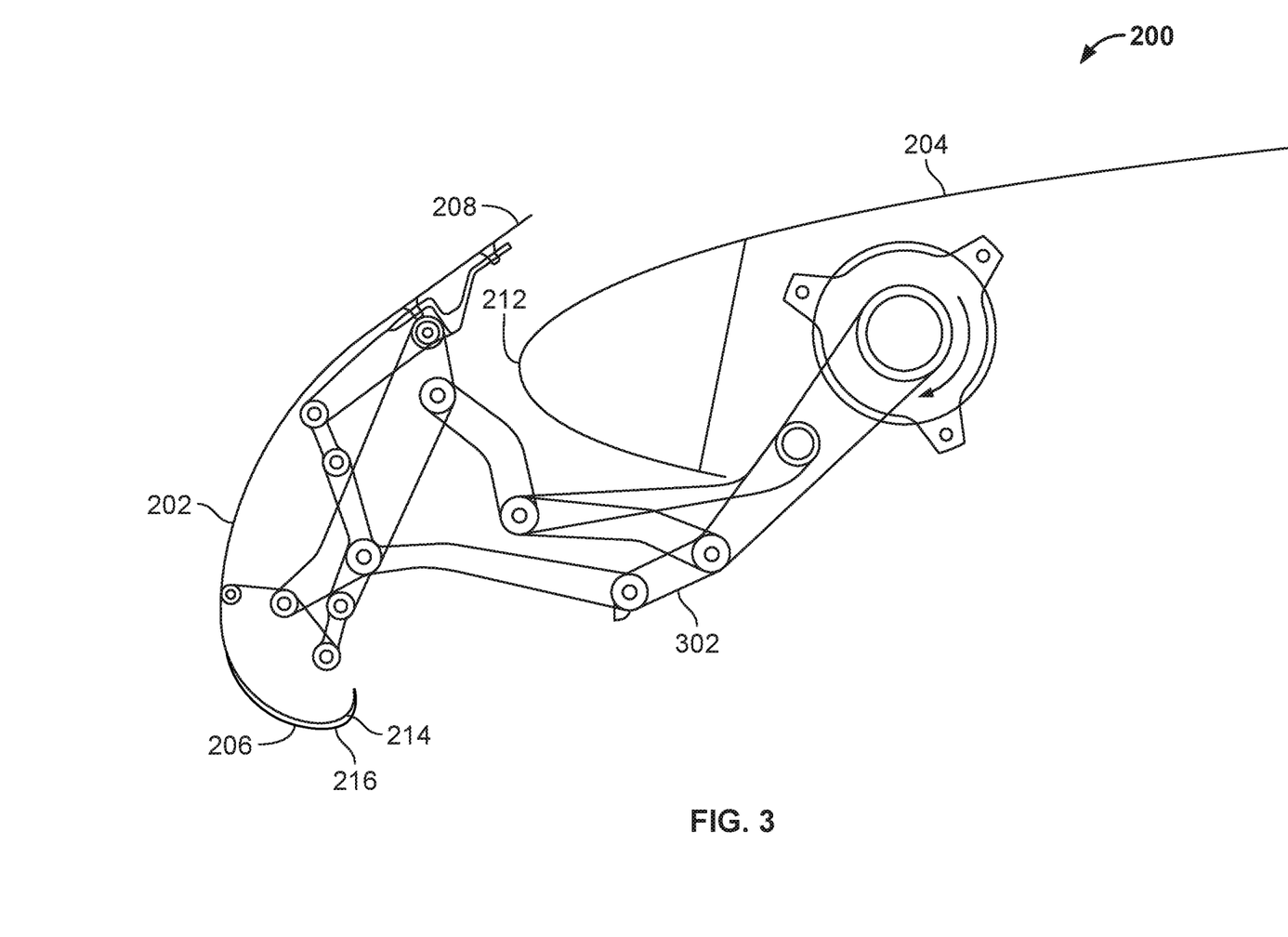
FIG. 3 is a cross-sectional view of the example Krueger flap and the example airfoil of FIG. 2 in the example deployed position of FIG. 2.

FIG. 2 is a partial cutaway perspective view of an example Krueger flap 202 (e.g., a variable camber Krueger flap) in an example deployed position 200 relative to an example airfoil 204. FIG. 3 is a cross-sectional view of the example Krueger flap 202 and the example airfoil 204 of FIG. 2 in the example deployed position 200 of FIG. 2. The Krueger flap 202 of FIGS. 2 and 3 may be implemented as any of the first Krueger flap 112, the second Krueger flap 114, the third Krueger flap 116, and/or the fourth Krueger flap 118 of the aircraft 100 of FIG. 1 described above. The airfoil 204 of FIGS. 2 and 3 may be implemented as any of the first wing 104 and/or the second wing 106 of the aircraft 100 of FIG. 1 described above.

In the illustrated example of FIGS. 2 and 3, the Krueger flap 202 is coupled to the airfoil 204 via an example linkage assembly 302. The linkage assembly 302 enables movement of the Krueger flap 202 relative to the airfoil 204 between a stowed position and a deployed position. For example, the linkage assembly 302 may enable movement of the Krueger flap 202 from the deployed position 200 shown in FIGS. 2 and 3 to an example stowed position 400 shown in FIGS. 4 and 5 and further described below. In some examples, movement of the linkage assembly 302 of FIGS. 2 and 3 occurs via an actuator coupled to the linkage assembly 302 and controlled via a controller coupled to the actuator. Example linkage assemblies, actuators, and controllers that may be utilized to implement the linkage assembly 302 of FIGS. 2 and 3 to move the Krueger flap 202 of FIGS. 2 and 3 relative to the airfoil 204 of FIGS. 2 and 3 are illustrated and described in U.S. Pat. Nos. 9,016,637 and 9,365,284, both of which are incorporated by reference herein in their entireties.

In the illustrated example of FIGS. 2 and 3, the Krueger flap 202 includes an example bullnose 206 and an example trailing end 208 located opposite the bullnose 206. The bullnose 206 of the Krueger flap 202 extends in an example spanwise direction 210 associated with the airfoil 204 to which the Krueger flap 202 is coupled. The airfoil 204 includes an example leading edge 212 that extends in the spanwise direction 210 of the airfoil 204.

When the Krueger flap 202 is positioned in the deployed position 200 shown in FIGS. 2 and 3, the bullnose 206 of the Krueger flap 202 is located forward of the trailing end 208 of the Krueger flap 202 and forward of the leading edge 212 of the airfoil 204. The bullnose 206 of the Krueger flap 202 is exposed to an airflow when the Krueger flap 202 is positioned in the deployed position 200 of FIGS. 2 and 3. Thus, the bullnose 206 of the Krueger flap 202 has an impact on an airflow presented at and/or along the bullnose 206 and/or the leading edge 212 of the airfoil 204 when the Krueger flap 202 is positioned in the deployed position 200 of FIGS. 2 and 3. In some examples, the Krueger flap 202 may be positioned in the deployed position 200 of FIGS. 2 and 3 during a take-off operation and/or during a landing operation of a flight of an aircraft (e.g., the aircraft 100 of FIG. 1) implementing the Krueger flap 202. In some examples, the Krueger flap 202 may be positioned in the deployed position 200 of FIGS. 2 and 3 when an aircraft (e.g., the aircraft 100 of FIG. 1) implementing the Krueger flap 202 is traveling at a speed of approximately Mach 0.4 or less.

In the illustrated example of FIGS. 2 and 3, the bullnose 206 of the Krueger flap 202 includes an example contour variation 214 along the spanwise direction 210 of the airfoil 204. The contour variation 214 of the bullnose 206 of FIGS. 2 and 3 is formed by a plurality of example protuberances 216 located in a periodic manner along the bullnose 206. Respective ones of the protuberances 216 are spaced on the bullnose 206 along and/or in the spanwise direction 210 of the airfoil 204. In the illustrated example of FIGS. 2 and 3, the contour variation 214 and/or protuberances 216 extend(s) fully across the bullnose 206 in the spanwise direction 210 of the airfoil 204. In other examples, the contour variation 214 and/or protuberances 216 may extend across only a portion of the bullnose 206 in the spanwise direction 210 of the airfoil 204.

In some examples, the contour variation 214 of the bullnose 206 of FIGS. 2 and 3 has an undulating profile as a result of the shape and/or spacing of respective ones of the protuberances 216 on the bullnose 206 along and/or in the spanwise direction 210 of the airfoil 204. In some examples, the undulating profile resulting from the shape and/or spacing of respective ones of the protuberances 216 on the bullnose 206 along and/or in the spanwise direction 210 of the airfoil 204 may take the form of a sine wave having an associated height and an associated wavelength. In some examples, the height(s) of respective ones of the protuberances 216 may preferably be in the range of between five percent (5%) and twenty percent (20%) of the chord of the Krueger flap 202, and the wavelength(s) of respective ones of the protuberances 216 may preferably be in the range of between twenty percent (20%) and four-hundred percent (400%) of the chord of the Krueger flap 202.

The protuberances 216 of FIGS. 2 and 3 are shaped, sized, oriented and/or otherwise configured to increase a lift to drag (L/D) ratio associated with the Krueger flap 202 and/or the airfoil 204 of FIGS. 2 and 3 when the Krueger flap 202 is positioned in a deployed position (e.g., the deployed position 200 of FIGS. 2 and 3). For example, when implemented in and deployed from an aircraft (e.g., the aircraft 100 of FIG. 1), the contour variation 214 and/or protuberances 216 of the bullnose 206 of the Krueger flap 202 may provide an increased lift to drag (L/D) ratio for the Krueger flap 202 and/or the airfoil 204 relative to a lift to drag (L/D) ratio associated with a deployed Krueger flap having a linear bullnose (e.g., a bullnose lacking the above-described contour variation 214 and/or protuberances 216). In some examples, the respective sizes (e.g., respective amplitudes) of the protuberances 216 and the respective spacings (e.g., respective wavelengths) between adjacent ones of the protuberances 216 are design variables that may be determined and implemented in a manner that optimizes the increase in lift to drag (L/D) ratio attributable to the presence of the protuberances 216. In some examples, a reduction in drag attributable to the contour variation 214 and/or the protuberances 216 may provide for a reduction in noise associated with the Krueger flap 202 and/or the airfoil 204 to which the Krueger flap 202 is coupled. In some examples, the contour variation 214 and/or the protuberances 216 may reduce a rate at which ice forms and/or accumulates on the bullnose 206 of the Krueger flap 202.

In some examples, the protuberances 216 of FIGS. 2 and 3 may have shapes and/or profiles that are aerodynamically contoured. For example, the protuberances 216 may be formed as aerodynamically-contoured (e.g., smooth) fairings having rounded and/or curved shapes and/or profiles. In other examples, the protuberances 216 may have shapes and/or profiles that are angular (e.g., sharply contoured).

In the illustrated example of FIGS. 2 and 3, the protuberances 216 of the bullnose 206 are uniformly shaped. In other examples, a first one of the protuberances 216 of the bullnose 206 may have a first shape, and a second one of the protuberances 216 of the bullnose 206 may have a second shape that differs from the first shape. Thus, in some examples, the respective shapes of adjacent ones of the protuberances 216 of the bullnose 206 may be non-uniform.

In the illustrated example of FIGS. 2 and 3, the protuberances 216 of the bullnose 206 are uniformly sized. In other examples, a first one of the protuberances 216 of the bullnose 206 may have a first size (e.g., a first amplitude), and a second one of the protuberances 216 of the bullnose 206 may have a second size (e.g., a second amplitude) that differs from the first size. For example, the respective sizes of adjacent ones of the protuberances 216 of the bullnose 206 may gradually decrease from an inboard side of the bullnose 206 to an outboard side of the bullnose 206 along and/or in the spanwise direction 210 of the airfoil 204. As another example, the respective sizes of adjacent ones of the protuberances 216 of the bullnose 206 may gradually increase from an inboard side of the bullnose 206 to an outboard side of the bullnose 206 along and/or in the spanwise direction 210 of the airfoil 204. As another example, the respective sizes of adjacent ones of the protuberances 216 of the bullnose 206 may gradually increase from an inboard side of the bullnose 206 to an outboard side of the bullnose 206 along and/or in the spanwise direction 210 of the airfoil 204 over a first portion of the bullnose 206, and may gradually decrease from an inboard side of the bullnose 206 to an outboard side of the bullnose 206 along and/or in the spanwise direction 210 of the airfoil 204 over a second portion of the bullnose 206 adjacent the first portion of the bullnose 206. As another example, the respective sizes of adjacent ones of the protuberances 216 of the bullnose 206 may gradually decrease from an inboard side of the bullnose 206 to an outboard side of the bullnose 206 along and/or in the spanwise direction 210 of the airfoil 204 over a first portion of the bullnose 206, and may gradually increase from an inboard side of the bullnose 206 to an outboard side of the bullnose 206 along and/or in the spanwise direction 210 of the airfoil 204 over a second portion of the bullnose 206 adjacent the first portion of the bullnose 206. Thus, in some examples, the respective sizes of adjacent ones of the protuberances 216 of the bullnose 206 may be non-uniform.

In the illustrated example of FIGS. 2 and 3, the protuberances 216 of the bullnose 206 are uniformly oriented. In other examples, a first one of the protuberances 216 of the bullnose 206 may have a first orientation relative to the spanwise direction 210 of the airfoil 204, and a second one of the protuberances 216 of the bullnose 206 may have a second orientation relative to the spanwise direction 210 of the airfoil 204 that differs from the first orientation. For example, the respective angular orientations of adjacent ones of the protuberances 216 of the bullnose 206 relative to the spanwise direction 210 of the airfoil 204 may gradually increase from an inboard side of the bullnose 206 to an outboard side of the bullnose 206 along and/or in the spanwise direction 210 of the airfoil 204. As another example, the respective angular orientations of adjacent ones of the protuberances 216 of the bullnose 206 relative to the spanwise direction 210 of the airfoil 204 may gradually decrease from an inboard side of the bullnose 206 to an outboard side of the bullnose 206 along and/or in the spanwise direction 210 of the airfoil 204. As another example, the respective angular orientations of adjacent ones of the protuberances 216 of the bullnose 206 may gradually increase from an inboard side of the bullnose 206 to an outboard side of the bullnose 206 along and/or in the spanwise direction 210 of the airfoil 204 over a first portion of the bullnose 206, and may gradually decrease from an inboard side of the bullnose 206 to an outboard side of the bullnose 206 along and/or in the spanwise direction 210 of the airfoil 204 over a second portion of the bullnose 206 adjacent the first portion of the bullnose 206. As another example, the respective angular orientations of adjacent ones of the protuberances 216 of the bullnose 206 may gradually decrease from an inboard side of the bullnose 206 to an outboard side of the bullnose 206 along and/or in the spanwise direction 210 of the airfoil 204 over a first portion of the bullnose 206, and may gradually increase from an inboard side of the bullnose 206 to an outboard side of the bullnose 206 along and/or in the spanwise direction 210 of the airfoil 204 over a second portion of the bullnose 206 adjacent the first portion of the bullnose 206. Thus, in some examples, the respective orientations of adjacent ones of the protuberances 216 of the bullnose 206 may be non-uniform.

In the illustrated example of FIGS. 2 and 3, the protuberances 216 of the bullnose 206, in addition to being uniformly shaped, sized and oriented, are also uniformly spaced along and/or in the spanwise direction 210 of the airfoil 204. In other examples, a first one of the protuberances 216 of the bullnose 206 may be spaced along and/or in the spanwise direction 210 of the airfoil 204 at a first distance from a second one of the protuberances 216 of the bullnose 206, and the second one of the protuberances 216 of the bullnose 206 may be spaced along and/or in the spanwise direction 210 of the airfoil 204 at a second distance from a third one of the protuberances 216 of the bullnose 206, the second distance being different from the first distance. For example, the respective spacings between adjacent ones of the protuberances 216 of the bullnose 206 may gradually increase from an inboard side of the bullnose 206 to an outboard side of the bullnose 206 along and/or in the spanwise direction 210 of the airfoil 204. As another example, the respective spacings between adjacent ones of the protuberances 216 of the bullnose 206 may gradually decrease from an inboard side of the bullnose 206 to an outboard side of the bullnose 206 along and/or in the spanwise direction 210 of the airfoil 204. As another example, the respective spacings between adjacent ones of the protuberances 216 of the bullnose 206 may gradually increase from an inboard side of the bullnose 206 to an outboard side of the bullnose 206 along and/or in the spanwise direction 210 of the airfoil 204 over a first portion of the bullnose 206, and may gradually decrease from an inboard side of the bullnose 206 to an outboard side of the bullnose 206 along and/or in the spanwise direction 210 of the airfoil 204 over a second portion of the bullnose 206 adjacent the first portion of the bullnose 206. As another example, the respective spacings between adjacent ones of the protuberances 216 of the bullnose 206 may gradually decrease from an inboard side of the bullnose 206 to an outboard side of the bullnose 206 along and/or in the spanwise direction 210 of the airfoil 204 over a first portion of the bullnose 206, and may gradually increase from an inboard side of the bullnose 206 to an outboard side of the bullnose 206 along and/or in the spanwise direction 210 of the airfoil 204 over a second portion of the bullnose 206 adjacent the first portion of the bullnose 206. Thus, in some examples, the respective spacings between adjacent ones of the protuberances 216 of the bullnose 206 may be non-uniform.

When the Krueger flap 202 is positioned in the deployed position 200 shown in FIGS. 2 and 3, the contour variation 214 and/or protuberances 216 of the bullnose 206 of the Krueger flap 202 is/are exposed to an airflow presented at the bullnose 206 and/or the leading edge 212 of the airfoil 204. Thus, the contour variation 214 and/or protuberances 216 of the bullnose 206 of the Krueger flap 202 has/have an impact on an airflow presented at and/or along the bullnose 206 and/or the leading edge 212 of the airfoil 204 when the Krueger flap 202 is positioned in the deployed position 200 of FIGS. 2 and 3. In some examples, the contour variation 214 and/or protuberances 216 of the bullnose 206 of the Krueger flap 202 may be positioned in the deployed position 200 of FIGS. 2 and 3 during a take-off operation and/or during a landing operation of a flight of an aircraft (e.g., the aircraft 100 of FIG. 1) implementing the Krueger flap 202.

Figure 4:
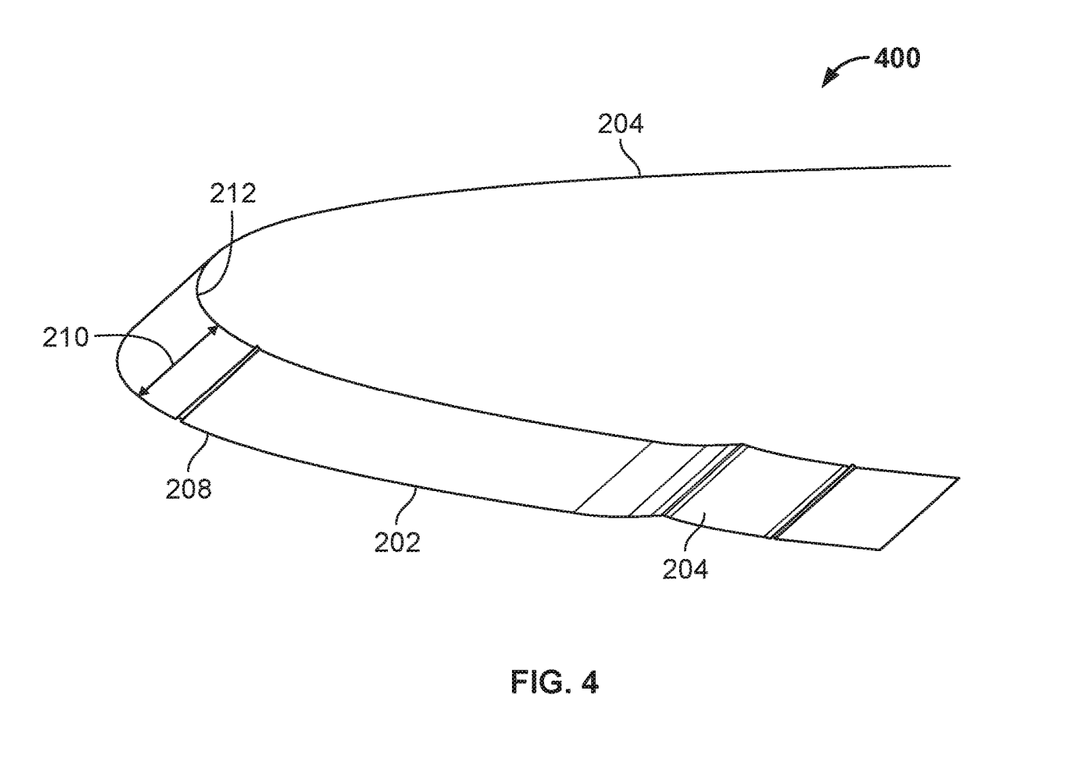
FIG. 4 is a partial cutaway perspective view of the example Krueger flap of FIGS. 2 and 3 in an example stowed position relative to the example airfoil of FIGS. 2 and 3.
Figure 5:
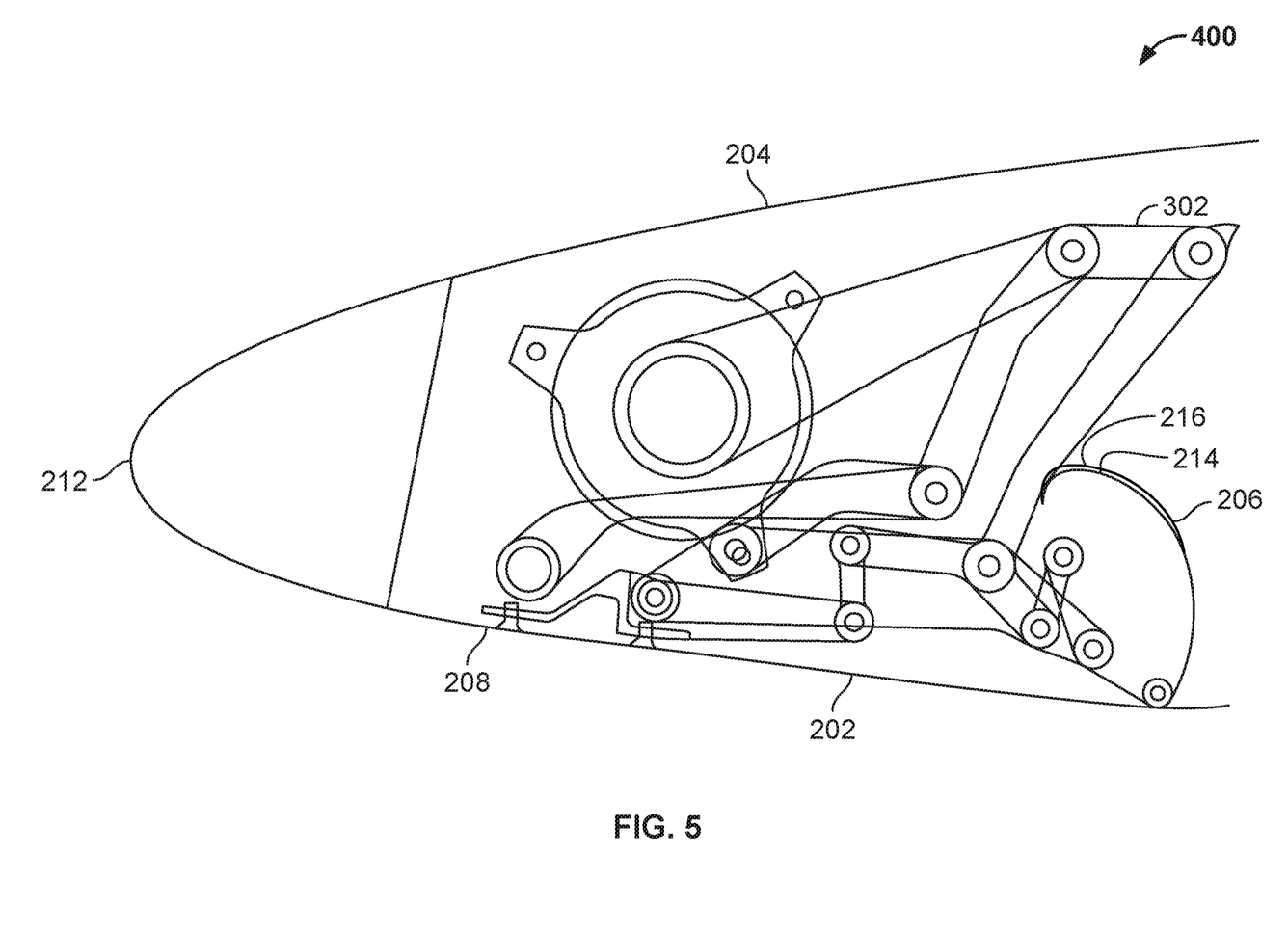
FIG. 5 is a cross-sectional view of the example Krueger flap and the example airfoil of FIGS. 2-4 in the example stowed position of FIG. 4.

In some examples, the Krueger flap 202 of FIGS. 2 and 3 is movable (e.g., via the linkage assembly 302 of FIGS. 2 and 3) relative to the airfoil 204 of FIGS. 2 and 3 between the deployed position 200 of FIGS. 2 and 3 described above and a stowed position. FIG. 4 is a partial cutaway perspective view of the example Krueger flap 202 of FIGS. 2 and 3 in an example stowed position 400 relative to the example airfoil 204 of FIGS. 2 and 3. FIG. 5 is a cross-sectional view of the example Krueger flap 202 and the example airfoil 204 of FIGS. 2-4 in the example stowed position 400 of FIG. 4.

When the Krueger flap 202 of FIGS. 2-5 is positioned in the stowed position 400 shown in FIGS. 4 and 5, the trailing end 208 of the Krueger flap 202 is located rearward and/or aft of the leading edge 212 of the airfoil 204, and the bullnose 206 of the Krueger flap 202 is located rearward and/or aft of the trailing end 208 of the Krueger flap 202. As shown in FIG. 5, the bullnose 206 of the Krueger flap 202 is hidden, retracted, and/or housed within the airfoil 204 when the Krueger flap 202 is positioned in the stowed position 400 of FIGS. 4 and 5. Thus, when the Krueger flap 202 is positioned in the stowed position 400 of FIGS. 4 and 5, the bullnose 206 of the Krueger flap 202 is not exposed to an airflow presented at the airfoil 204. For example, when the Krueger flap 202 is positioned in the stowed position 400 of FIGS. 4 and 5, the bullnose 206 of the Krueger flap 202 has no impact on an airflow presented at and/or along the leading edge 212 of the airfoil 204. In some examples, the Krueger flap 202 may be positioned in the stowed position 400 of FIGS. 4 and 5 during a cruise operation of a flight of an aircraft (e.g., the aircraft 100 of FIG. 1) implementing the Krueger flap 202, and/or when the aircraft implementing the Krueger flap 202 is grounded and/or not in operation. In some examples, the Krueger flap 202 may be positioned in the stowed position 400 of FIGS. 4 and 5 when an aircraft (e.g., the aircraft 100 of FIG. 1) implementing the Krueger flap 202 is traveling at a speed greater than Mach 0.4.

As described above in connection with FIGS. 2 and 3, the bullnose 206 of the Krueger flap 202 includes the contour variation 214 and/or protuberances 216. Accordingly, when the Krueger flap 202 of FIGS. 2-5 is positioned in the stowed position 400 of FIGS. 4 and 5, the contour variation 214 and/or protuberances 216 of the bullnose 206 of the Krueger flap 202 is/are not exposed to an airflow presented at the airfoil 204. For example, when the Krueger flap 202 is positioned in the stowed position 400 of FIGS. 4 and 5, the contour variation 214 and/or protuberances 216 of the bullnose 206 of the Krueger flap 202 has/have no impact on an airflow presented at and/or along the leading edge 212 of the airfoil 204. In some examples, the contour variation 214 and/or protuberances 216 of the bullnose 206 of the Krueger flap 202 may be positioned in the stowed position 400 of FIGS. 4 and 5 during a cruise operation of a flight of an aircraft (e.g., the aircraft 100 of FIG. 1) implementing the Krueger flap 202, and/or when the aircraft implementing the Krueger flap 202 is grounded and/or not in operation.

Figure 6:
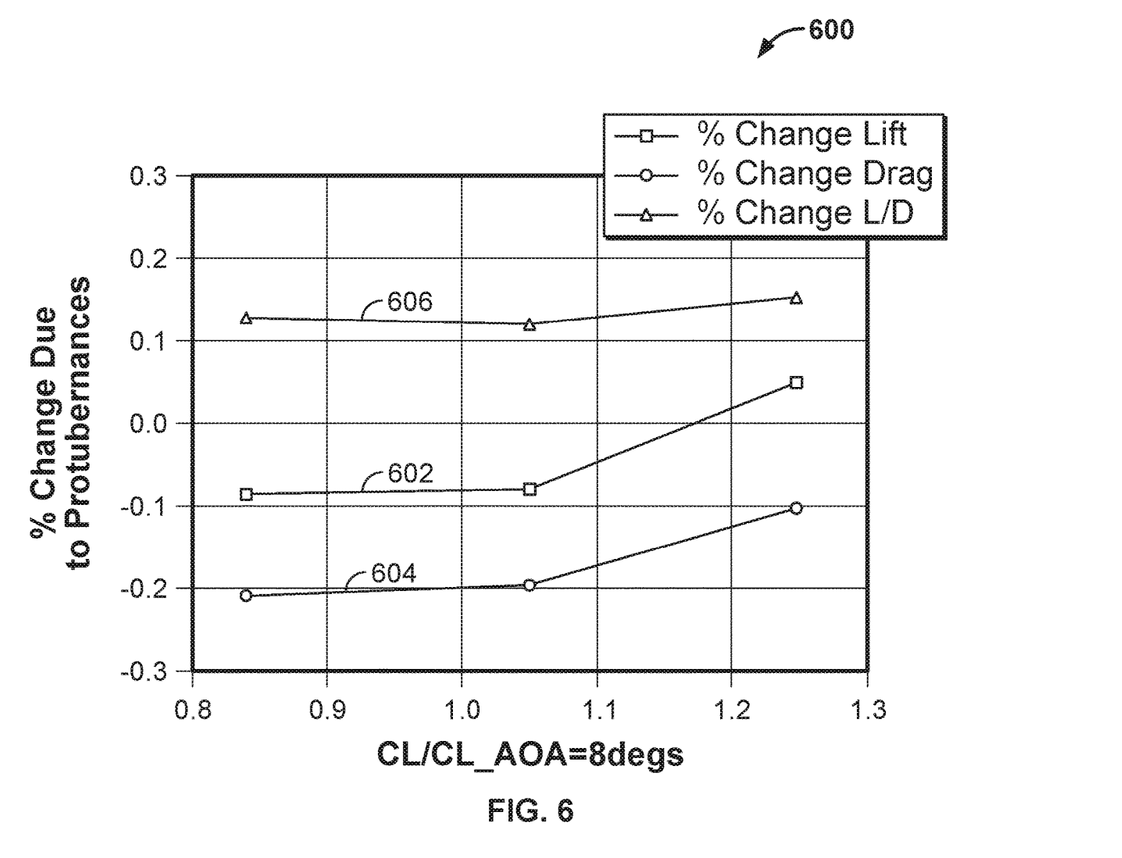
FIG. 6 is an example graph illustrating changes in lift, drag, and lift to drag (L/D) ratio associated with the example Krueger flap of FIGS. 2-5 as a function of a non-dimensional lift coefficient ratio value.

FIG. 6 is an example graph 600 illustrating changes in lift, drag, and lift to drag (L/D) ratio associated with the example Krueger flap 202 of FIGS. 2-5 as a function of a non-dimensional lift coefficient ratio (e.g., where "CL_AOA=8 degs" is a non-dimensional lift coefficient associated with an angle of attack of eight degrees). More specifically, the data plotted in the graph 600 of FIG. 6 corresponds to percentages of change in lift, drag, and lift to drag (L/D) ratio associated with an airfoil incorporating a Krueger flap having a bullnose including an example contour variation and/or example protuberances along and/or on the bullnose in the spanwise direction of the airfoil (e.g., the Krueger flap 202 of FIGS. 2-5 having the bullnose 206 including the contour variation 214 and protuberances 216 formed along the bullnose 206 in the spanwise direction 210 of the airfoil 204 of FIGS. 2-5) relative to an airfoil incorporating a Krueger flap having a bullnose that is linear along the spanwise direction of the airfoil. The data plotted in the graph 600 of FIG. 6 pertains to the implementation of a Krueger flap having a bullnose including uniformly-spaced protuberances located in a periodic manner over a portion of the spanwise direction of the airfoil.

A first example plot 602 of the graph 600 illustrates the percentage of change in lift associated with an airfoil incorporating a Krueger flap having a bullnose including a contour variation and/or protuberances along and/or on the bullnose in the spanwise direction of the airfoil (e.g., the Krueger flap 202 of FIGS. 2-5 having the bullnose 206 including the contour variation 214 and/or protuberances 216 formed along and/or on the bullnose 206 in the spanwise direction 210 of the airfoil 204 of FIGS. 2-5) relative to an airfoil incorporating a Krueger flap having a bullnose that is linear along the spanwise direction of the airfoil. A second example plot 604 of the graph 600 illustrates the percentage of change in drag associated with an airfoil incorporating a Krueger flap having a bullnose including a contour variation and/or protuberances along and/or on the bullnose in the spanwise direction of the airfoil (e.g., the Krueger flap 202 of FIGS. 2-5 having the bullnose 206 including the contour variation 214 and/or protuberances 216 formed along and/or on the bullnose 206 in the spanwise direction 210 of the airfoil 204 of FIGS. 2-5) relative to an airfoil incorporating a Krueger flap having a bullnose that is linear along the spanwise direction of the airfoil. A third example plot 606 of the graph 600 illustrates the percentage of change in lift to drag (L/D) ratio associated with an airfoil incorporating a Krueger flap having a bullnose including a contour variation and/or protuberances along and/or on the bullnose in the spanwise direction of the airfoil (e.g., the Krueger flap 202 of FIGS. 2-5 having the bullnose 206 including the contour variation 214 and/or protuberances 216 formed along and/or on the bullnose 206 in the spanwise direction 210 of the airfoil 204 of FIGS. 2-5) relative to an airfoil incorporating a Krueger flap having a bullnose that is linear along the spanwise direction of the airfoil.

As indicated by the positive percentage of change values associated with the third plot 606 of the graph 600 of FIG. 6, the airfoil implementing the Krueger flap having the bullnose that includes the contour variation and/or the protuberances along and/or on the bullnose in the spanwise direction of the airfoil provides for an increased lift to drag (L/D) ratio relative to the airfoil implementing the Krueger flap having a bullnose that is linear along the spanwise direction of the airfoil. The improved lift to drag (L/D) ratio is accordingly attributable to the presence of the contour variation and/or protuberances along and/or on the bullnose of the Krueger flap (e.g., the presence of the contour variation 214 and/or protuberances 216 formed along and/or on the bullnose 206 of the Krueger flap 202 of FIGS. 2-5).

In some examples, the improved lift to drag (L/D) ratio associated with the presence of the contour variation and/or protuberances may result from an increased lift characteristic (e.g., an increased lift value) attributable to the presence of the contour variation and/or protuberances. In other examples, the improved lift to drag (L/D) ratio associated with the presence of the contour variation and/or protuberances may result from a decreased drag characteristic (e.g. a decreased drag value) attributable to the presence of the contour variation and/or protuberances. In still other examples, the improved lift to drag (L/D) ratio associated with the presence of the contour variation and/or protuberances may result from a combination of an increased lift characteristic (e.g., an increased lift value) and a decreased drag characteristic (e.g., a decreased drag value), both of which are attributable to the presence of the contour variation and/or protuberances. In still other examples, the improved lift to drag (L/D) ratio associated with the presence of the contour variation and/or protuberances may result from a combination of a decreased drag characteristic (e.g., a decreased drag value) that exceeds (e.g., demonstrates a more negative percentage of change than) a decreased lift characteristic (e.g., a decreased lift value), both of which are attributable to the presence of the contour variation and/or protuberances.

Figure 7:
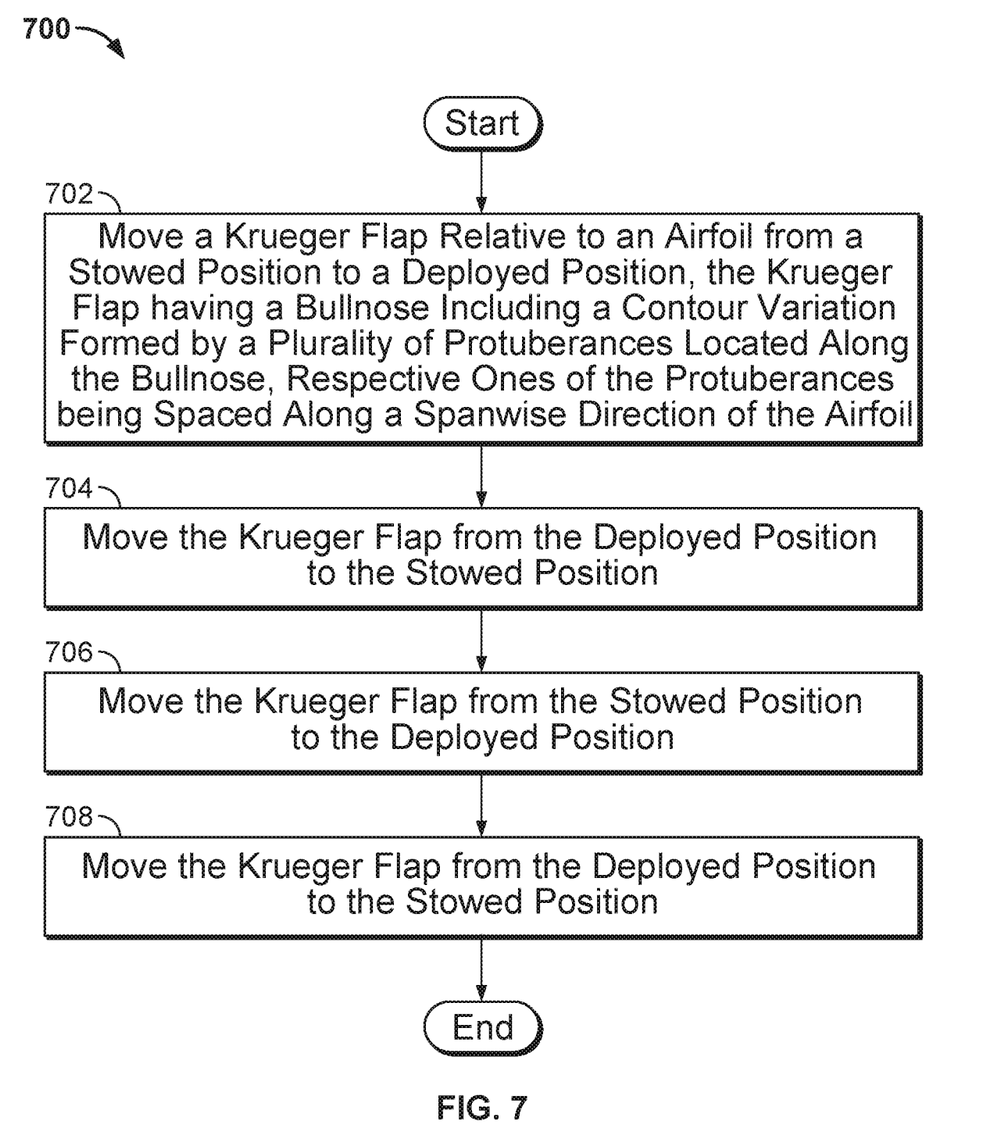
FIG. 7 is a flowchart representative of an example method for positioning the example Krueger flap of FIGS. 2-5 relative to the example airfoil of FIGS. 2-5.

FIG. 7 is a flowchart representative of an example method 700 for positioning the example Krueger flap 202 of FIGS. 2-5 relative to the example airfoil 204 of FIGS. 2-5. In some examples, the method 700 of FIG. 7 is applicable to a flight sequence that includes a ground departure and/or pre-takeoff operation, a takeoff and/or climb operation, a cruise operation, a descent and/or landing operation, and a ground arrival and/or post-landing operation. The flight sequence may additionally include a holding operation in which the Krueger flap 202 of FIGS. 2-5 may be deployed. In some examples, one or more of the movement(s) of the Krueger flap 202 of FIGS. 2-5 relative to the airfoil 204 of FIGS. 2-5 as described herein in connection with the method 700 of FIG. 7 may occur via the linkage assembly 302 of FIGS. 2-5 that couples the Krueger flap 202 to the airfoil 204. In some examples, one or more movement(s) of the linkage assembly 302 corresponding to one or more movement(s) of the Krueger flap 202 relative to the airfoil 204 occur(s) via an actuator coupled to the linkage assembly 302 and controlled via a controller coupled to the actuator.

The method 700 of FIG. 7 pertains to moving a Krueger flap having a bullnose that includes a contour variation formed by a plurality of protuberances located along the bullnose, with respective ones of the protuberances being spaced along a spanwise direction. For example, the method 700 of FIG. 7 may involve moving the Krueger flap 202 having the bullnose 206 that includes the contour variation 214 formed by the protuberances 216 located along the bullnose 206, with respective ones of the protuberances 216 being spaced along the spanwise direction 210 of the airfoil 204, as described above in connection with FIGS. 2-5.

The method 700 of FIG. 7 begins with and/or otherwise includes moving a Krueger flap relative to an airfoil from a stowed position to a deployed position (block 702). For example, in connection with block 702 of FIG. 7, the Krueger flap 202 of FIGS. 2-5 may be moved relative to the airfoil 204 of FIGS. 2-5 from the stowed position 400 of FIGS. 4 and 5 to the deployed position 200 of FIGS. 2 and 3. In some examples in connection with block 702 of FIG. 7, an aircraft (e.g., the aircraft 100 of FIG. 1) implementing the Krueger flap 202 of FIGS. 2-5 may be performing a ground departure and/or pre-takeoff operation (e.g., taxiing from a terminal to a runway) when the Krueger flap 202 is in the stowed position, and may be performing a takeoff and/or climb operation when the Krueger flap 202 is in the deployed position. In some examples in connection with block 702 of FIG. 7, an aircraft (e.g., the aircraft 100 of FIG. 1) implementing the Krueger flap 202 of FIGS. 2-5 may be traveling at a speed of approximately Mach 0.4 or less when the Krueger flap 202 is in the deployed position.

When the Krueger flap 202 is positioned in the deployed position in connection with block 702 of FIG. 7, the contour variation 214 and/or protuberances 216 of the bullnose 206 of the Krueger flap 202 is/are exposed to an airflow presented at the bullnose 206 and/or the leading edge 212 of the airfoil 204. Thus, the contour variation 214 and/or protuberances 216 of the bullnose 206 of the Krueger flap 202 has/have an impact on an airflow presented at and/or along the bullnose 206 and/or the leading edge 212 of the airfoil 204 when the Krueger flap 202 is positioned in the deployed position in connection with block 702 of FIG. 7.

The method 700 of FIG. 7 includes moving the Krueger flap relative to the airfoil from the deployed position to the stowed position (block 704). For example, in connection with block 704 of FIG. 7, the Krueger flap 202 of FIGS. 2-5 may be moved relative to the airfoil 204 of FIGS. 2-5 from the deployed position 200 of FIGS. 2 and 3 to the stowed position 400 of FIGS. 4 and 5. In some examples in connection with block 704 of FIG. 7, an aircraft (e.g., the aircraft 100 of FIG. 1) implementing the Krueger flap 202 of FIGS. 2-5 may be performing a takeoff and/or climb operation when the Krueger flap is in the deployed position, and may be performing a cruise operation when the Krueger flap is in the stowed position. In some examples in connection with block 704 of FIG. 7, an aircraft (e.g., the aircraft 100 of FIG. 1) implementing the Krueger flap 202 of FIGS. 2-5 may be traveling at a speed of approximately Mach 0.4 or less when the Krueger flap 202 is in the deployed position. In some examples in connection with block 704 of FIG. 7, an aircraft (e.g., the aircraft 100 of FIG. 1) implementing the Krueger flap 202 of FIGS. 2-5 may be traveling at a speed of greater than Mach 0.4 when the Krueger flap 202 is in the stowed position.

When the Krueger flap 202 is positioned in the stowed position in connection with block 704 of FIG. 7, the contour variation 214 and/or protuberances 216 of the bullnose 206 of the Krueger flap 202 is/are not exposed to an airflow presented at the leading edge 212 of the airfoil 204. Thus, the contour variation 214 and/or protuberances 216 of the bullnose 206 of the Krueger flap 202 has/have no impact on an airflow presented at and/or along the leading edge 212 of the airfoil 204 when the Krueger flap 202 is positioned in the stowed position in connection with block 704 of FIG. 7.

The method 700 of FIG. 7 includes a second instance of moving the Krueger flap relative to the airfoil from the stowed position to the deployed position (block 706). For example, in connection with block 706 of FIG. 7, the Krueger flap 202 of FIGS. 2-5 may be moved relative to the airfoil 204 of FIGS. 2-5 from the stowed position 400 of FIGS. 4 and 5 to the deployed position 200 of FIGS. 2 and 3. In some examples in connection with block 706 of FIG. 7, an aircraft (e.g., the aircraft 100 of FIG. 1) implementing the Krueger flap 202 of FIGS. 2-5 may be performing a cruise operation when the Krueger flap is in the stowed position, and may be performing a descent and/or landing operation when the Krueger flap is in the deployed position. In some examples in connection with block 706 of FIG. 7, an aircraft (e.g., the aircraft 100 of FIG. 1) implementing the Krueger flap 202 of FIGS. 2-5 may be traveling at a speed of greater than Mach 0.4 when the Krueger flap 202 is in the stowed position. In some examples in connection with block 706 of FIG. 7, an aircraft (e.g., the aircraft 100 of FIG. 1) implementing the Krueger flap 202 of FIGS. 2-5 may be traveling at a speed of approximately Mach 0.4 or less when the Krueger flap 202 is in the deployed position.

When the Krueger flap 202 is positioned in the deployed position in connection with block 706 of FIG. 7, the contour variation 214 and/or protuberances 216 of the bullnose 206 of the Krueger flap 202 is/are exposed to an airflow presented at the bullnose 206 and/or the leading edge 212 of the airfoil 204. Thus, the contour variation 214 and/or protuberances 216 of the bullnose 206 of the Krueger flap 202 has/have an impact on an airflow presented at and/or along the bullnose 206 and/or the leading edge 212 of the airfoil 204 when the Krueger flap 202 is positioned in the deployed position in connection with block 706 of FIG. 7.

The method 700 of FIG. 7 includes a second instance of moving the Krueger flap relative to the airfoil from the deployed position to the stowed position (block 708). For example, in connection with block 708 of FIG. 7, the Krueger flap 202 of FIGS. 2-5 may be moved relative to the airfoil 204 of FIGS. 2-5 from the deployed position 200 of FIGS. 2 and 3 to the stowed position 400 of FIGS. 4 and 5. In some examples in connection with block 708 of FIG. 7, an aircraft (e.g., the aircraft 100 of FIG. 1) implementing the Krueger flap 202 of FIGS. 2-5 may be performing a descent and/or landing operation when the Krueger flap is in the deployed position, and may be performing a ground arrival and/or post-landing operation (e.g., taxiing from a runway to a terminal) when the Krueger flap is in the stowed position. In some examples in connection with block 708 of FIG. 7, an aircraft (e.g., the aircraft 100 of FIG. 1) implementing the Krueger flap 202 of FIGS. 2-5 may be traveling at a speed of approximately Mach 0.4 or less when the Krueger flap 202 is in the deployed position.

When the Krueger flap 202 is positioned in the stowed position in connection with block 708 of FIG. 7, the contour variation 214 and/or protuberances 216 of the bullnose 206 of the Krueger flap 202 is/are not exposed to an airflow presented at the leading edge 212 of the airfoil 204. Thus, the contour variation 214 and/or protuberances 216 of the bullnose 206 of the Krueger flap 202 has/have no impact on an airflow presented at and/or along the leading edge 212 of the airfoil 204 when the Krueger flap 202 is positioned in the stowed position in connection with block 708 of FIG. 7. Following block 708, the method 700 of FIG. 7 ends.

From the foregoing, it will be appreciated that the disclosed Krueger flap apparatus and methods advantageously include a bullnose extending in a spanwise direction of an airfoil, the bullnose having a contour variation formed by protuberances located along the bullnose, with respective ones of the protuberances being spaced along the spanwise direction. When the disclosed Krueger flaps are deployed during a flight of an aircraft, the contour variation of the bullnose is exposed to an airflow. Exposing the contour variation of the bullnose to the airflow advantageously provides for improved aerodynamics and/or handling of the aircraft in which the Krueger flap is implemented. For example, the contour variation of the bullnose may advantageously provide for an increased lift to drag (L/D) ratio associated with the airfoil of the aircraft when the Krueger flap is in a deployed position. In some examples, a reduction in drag attributable to the contour variation may advantageously provide for a reduction in noise associated with the Krueger flap and/or the airfoil to which the Krueger flap is coupled. In some examples, the contour variation of the bullnose may advantageously reduce a rate at which ice forms and/or accumulates on the bullnose of the Krueger flap.

When the disclosed Krueger flaps are stowed, the contour variation of the bullnose is hidden, retracted, and/or housed within the airfoil to which the Krueger flap is coupled. Thus, the disclosed Krueger flaps may advantageously be placed into the stowed position during flight operations in which exposure of the contour variation of the bullnose to an airflow may have an undesirable impact on the aerodynamics and/or handling of the aircraft (e.g., during a cruise operation of the aircraft). This particular advantage provided by the disclosed Krueger flaps is not capable of being implemented via alternative lift enhancement devices (e.g., slats, airfoils having integrated drooped leading edges, etc.), as the leading and/or forward edges of such alternative lift enhancement devices are not capable of being moved to a position in which a contour variation formed proximate the leading and/or forward edges of such alternative lift enhancement devices is not exposed to an airflow during a flight of the aircraft.

In some examples, an apparatus is disclosed comprising a Krueger flap. In some disclosed examples, the Krueger flap has a bullnose extending in a spanwise direction. In some disclosed examples, the bullnose includes a contour variation formed by a plurality of protuberances located along the bullnose. In some disclosed examples, respective ones of the protuberances are spaced along the spanwise direction.

In some disclosed examples of the apparatus, the protuberances are uniformly shaped. In some disclosed examples, the protuberances are uniformly spaced in the spanwise direction along the bullnose. In some disclosed examples, the contour variation has an undulating profile. In some disclosed examples, the contour variation extends fully across the bullnose in the spanwise direction. In some disclosed examples, the contour variation is to increase a lift to drag ratio associated with the Krueger flap.

In some disclosed examples of the apparatus, the Krueger flap is to be coupled to an airfoil. In some disclosed examples, the Krueger flap is to be movable relative to the airfoil between a stowed position and a deployed position. In some disclosed examples, the contour variation of the bullnose is to be exposed to an airflow when the Krueger flap is in the deployed position. In some disclosed examples, the contour variation of the bullnose is to be hidden from the airflow when the Krueger flap is in the stowed position. In some disclosed examples, the airfoil includes a leading edge. In some disclosed examples, the contour variation of the bullnose is to be located forward of the leading edge when the Krueger flap is in the deployed position. In some disclosed examples, the contour variation of the bullnose is to be located aft of the leading edge when the Krueger flap is in the stowed position.

In some examples, an apparatus is disclosed comprising an airfoil having a spanwise direction, and a Krueger flap coupled to the airfoil. In some disclosed examples, the Krueger flap has a bullnose extending in the spanwise direction. In some disclosed examples, the bullnose includes a contour variation formed by a plurality of protuberances located along the bullnose. In some disclosed examples, respective ones of the protuberances are spaced along the spanwise direction. In some disclosed examples, the Krueger flap is movable relative to the airfoil between a stowed position and a deployed position.

In some disclosed examples of the apparatus, the contour variation of the bullnose is to be exposed to an airflow when the Krueger flap is in the deployed position. In some disclosed examples, the contour variation of the bullnose is to be hidden from the airflow when the Krueger flap is in the stowed position. In some disclosed examples, the airfoil includes a leading edge. In some disclosed examples, the contour variation of the bullnose is to be located forward of the leading edge when the Krueger flap is in the deployed position. In some disclosed examples, the contour variation of the bullnose is to be located aft of the leading edge when the Krueger flap is in the stowed position.

In some disclosed examples of the apparatus, the protuberances are uniformly shaped. In some disclosed examples, the protuberances are uniformly spaced in the spanwise direction along the bullnose. In some disclosed examples, the contour variation has an undulating profile. In some disclosed examples, the contour variation extends fully across the bullnose in the spanwise direction. In some disclosed examples, the contour variation is to increase a lift to drag ratio associated with the Krueger flap.

In some examples, a method is disclosed. In some disclosed examples, the method comprises moving a Krueger flap relative to an airfoil between a stowed position and a deployed position. In some disclosed examples, the airfoil has a spanwise direction. In some disclosed examples, the Krueger flap is coupled to the airfoil and has a bullnose extending in the spanwise direction. In some disclosed examples, the bullnose includes a contour variation formed by a plurality of protuberances located along the bullnose. In some disclosed examples, respective ones of the protuberances are spaced along the spanwise direction.

In some disclosed examples of the method, the contour variation of the bullnose is to be exposed to an airflow when the Krueger flap is in the deployed position. In some disclosed examples, the contour variation of the bullnose is to be hidden from the airflow when the Krueger flap is in the stowed position. In some disclosed examples of the method, the airfoil includes a leading edge. In some disclosed examples, the contour variation of the bullnose is located forward of the leading edge when the Krueger flap is in the deployed position. In some disclosed examples, the contour variation of the bullnose is located aft of the leading edge when the Krueger flap is in the stowed position.

In some disclosed examples of the method, the protuberances are uniformly shaped. In some disclosed examples, the protuberances are uniformly spaced in the spanwise direction along the bullnose. In some disclosed examples, the contour variation has an undulating profile. In some disclosed examples, the contour variation extends fully across the bullnose in the spanwise direction. In some disclosed examples, the contour variation is to increase a lift to drag ratio associated with the Krueger flap.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a Krueger flap having a bullnose extending in a spanwise direction, the bullnose including a contour variation extending along the spanwise direction, the contour variation formed by a plurality of protuberances located along and projecting outwardly from the bullnose, respective ones of the protuberances being spaced along the spanwise direction, the contour variation having a continuous sinusoidal profile including an associated height and an associated wavelength, the associated height projecting outwardly from the bullnose.

2. The apparatus of claim 1, wherein the protuberances are uniformly shaped.

3. The apparatus of claim 1, wherein the protuberances are uniformly spaced in the spanwise direction along the bullnose.

4. The apparatus of claim 1, wherein the contour variation extends fully across the bullnose in the spanwise direction.

5. The apparatus of claim 1, wherein the contour variation is to increase a lift to drag ratio associated with the Krueger flap.

6. The apparatus of claim 1, wherein the Krueger flap is coupled to an airfoil, the Krueger flap to be movable relative to the airfoil between a stowed position and a deployed position.

7. The apparatus of claim 6, wherein the contour variation of the bullnose is exposed to an airflow when the Krueger flap is in the deployed position, and wherein the contour variation of the bullnose is hidden from the airflow when the Krueger flap is in the stowed position.

8. The apparatus of claim 6, wherein the airfoil includes a leading edge, the contour variation of the bullnose located forward of and oriented downward relative to the leading edge when the Krueger flap is in the deployed position, the contour variation of the bullnose located aft of the leading edge when the Krueger flap is in the stowed position.

9. The apparatus of claim 1, wherein the associated height is between five percent and twenty percent of a chord line length of the Krueger flap.

10. The apparatus of claim 9, wherein the associated wavelength is between twenty percent and four hundred percent of the chord line length.

11. An apparatus, comprising:
an airfoil having a spanwise direction; and
a Krueger flap coupled to the airfoil and having a bullnose extending in the spanwise direction, the bullnose including a contour variation extending along the spanwise direction, the contour variation formed by a plurality of protuberances located along and projecting outwardly from the bullnose, respective ones of the protuberances being spaced along the spanwise direction, the contour variation having a continuous sinusoidal profile including an associated height and an associated wavelength, the associated height projecting outwardly from the bullnose, the Krueger flap being movable relative to the airfoil between a stowed position and a deployed position.

12. The apparatus of claim 11, wherein the contour variation of the bullnose is exposed to an airflow when the Krueger flap is in the deployed position, and wherein the contour variation of the bullnose is hidden from the airflow when the Krueger flap is in the stowed position.

13. The apparatus of claim 11, wherein the airfoil includes a leading edge, the contour variation of the bullnose located forward of and oriented downward relative to the leading edge when the Krueger flap is in the deployed position, the contour variation of the bullnose located aft of the leading edge when the Krueger flap is in the stowed position.

14. The apparatus of claim 11, wherein the protuberances are uniformly shaped.

15. The apparatus of claim 11, wherein the protuberances are uniformly spaced in the spanwise direction along the bullnose.

16. The apparatus of claim 11, wherein the contour variation extends fully across the bullnose in the spanwise direction.

17. The apparatus of claim 11, wherein the contour variation is to increase a lift to drag ratio associated with the Krueger flap.

18. The apparatus of claim 11, wherein the associated height is between five percent and twenty percent of a chord line length of the Krueger flap.

19. The apparatus of claim 18, wherein the associated wavelength is between twenty percent and four hundred percent of the chord line length.

20. A method, comprising:
    moving a Krueger flap relative to an airfoil between a stowed position and a deployed position, the airfoil having a spanwise direction, the Krueger flap being coupled to the airfoil and having a bullnose extending in the spanwise direction, the bullnose including a contour variation extending along the spanwise direction, the contour variation formed by a plurality of protuberances located along and projecting outwardly from the bullnose, respective ones of the protuberances being spaced along the spanwise direction, the contour variation having a continuous sinusoidal profile including an associated height and an associated wavelength, the associated height projecting outwardly from the bullnose.

21. The method of claim 20, wherein the contour variation of the bullnose is exposed to an airflow when the Krueger flap is in the deployed position, and wherein the contour variation of the bullnose is hidden from the airflow when the Krueger flap is in the stowed position.

22. The method of claim 20, wherein the airfoil includes a leading edge, the contour variation of the bullnose being located forward of and oriented downward relative to the leading edge when the Krueger flap is in the deployed position, the contour variation of the bullnose being located aft of the leading edge when the Krueger flap is in the stowed position.

23. The method of claim 20, wherein the associated height is between five percent and twenty percent of a chord line length of the Krueger flap, and wherein the associated wavelength is between twenty percent and four hundred percent of the chord line length.

* * * * *

UNITED STATES PATENT AND TRADEMARK OFFICE
CERTIFICATE OF CORRECTION

PATENT NO. : 10,829,198 B2  
APPLICATION NO. : 15/629542  
DATED : November 10, 2020  
INVENTOR(S) : Clark et al.

Page 1 of 1

It is certified that error appears in the above-identified patent and that said Letters Patent is hereby corrected as shown below:

In the Claims

Column 16, Claim 6, Line 28, replace "Krueger flap to be movable" with --Krueger flap movable--

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*